(12) United States Patent
Otts

(10) Patent No.: US 10,824,719 B1
(45) Date of Patent: Nov. 3, 2020

(54) ANTI-MALWARE COMPUTER SYSTEMS AND METHOD

(71) Applicant: Rodney E. Otts, Perry, AR (US)

(72) Inventor: Rodney E. Otts, Perry, AR (US)

( * ) Notice: Subject to any disclaimer, the term of this patent is extended or adjusted under 35 U.S.C. 154(b) by 99 days.

(21) Appl. No.: 16/052,169

(22) Filed: Aug. 1, 2018

Related U.S. Application Data

(60) Provisional application No. 62/539,624, filed on Aug. 1, 2017.

(51) Int. Cl.
*G06F 21/54* (2013.01)
*G06F 21/57* (2013.01)
*G06F 21/56* (2013.01)
*H04L 29/06* (2006.01)

(52) U.S. Cl.
CPC ............ *G06F 21/54* (2013.01); *G06F 21/565* (2013.01); *G06F 21/57* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 7,640,583 | B1* | 12/2009 | Marinescu | G06F 21/55 713/187 |
| 8,250,652 | B1* | 8/2012 | Powell | G06F 21/566 726/22 |
| 8,997,081 | B1* | 3/2015 | Manion | G06F 8/65 717/168 |
| 9,825,984 | B1* | 11/2017 | Hoover | H04L 63/145 |
| 2003/0233574 | A1* | 12/2003 | Kouznetsov | G06F 21/56 726/23 |
| 2004/0030542 | A1* | 2/2004 | Fuji | G06F 40/47 704/2 |
| 2004/0193439 | A1* | 9/2004 | Marrott | G06Q 10/10 705/30 |
| 2004/0268007 | A1* | 12/2004 | Nguyen | G06F 9/3004 710/305 |
| 2007/0121943 | A1* | 5/2007 | Dellow | H04L 9/0662 380/252 |
| 2008/0086738 | A1* | 4/2008 | Nieminen | G06F 21/604 719/328 |
| 2012/0159193 | A1* | 6/2012 | Spradlin | G06F 21/51 713/190 |
| 2014/0068078 | A1* | 3/2014 | Hiremane | G06F 9/5044 709/226 |
| 2014/0282872 | A1* | 9/2014 | Hansen | G06F 21/125 726/3 |
| 2015/0039864 | A1* | 2/2015 | Tobin | G06F 21/56 712/220 |
| 2020/0125723 | A1* | 4/2020 | Lam | G06F 21/80 |

OTHER PUBLICATIONS

Ryan Francis, "The history of ransomware" found at https://www.csoonline.com/article/3095956/the-history-of-ransomware.html, Jul. 20.*

* cited by examiner

Primary Examiner — Piotr Poltorak
(74) Attorney, Agent, or Firm — Joe D. Calhoun

(57) ABSTRACT

A method of preventing execution of malware programming in a computing environment, by modifying the portion(s) of computer file names and/or headers and/or file content recognized by the computer for executing said programming. Accordingly, the computer will not recognize the malware file (having standard executable program files) as an executable file, so that the malware program will never be activated.

17 Claims, 6 Drawing Sheets

ANTI-MALWARE COMPUTER SYSTEMS AND METHOD

CROSS REFERENCE TO RELATED APPLICATIONS

This application claims the benefit of filing-date priority of Provisional Application No. 62/539,624 filed on Aug. 1, 2017, which is fully incorporated herein by reference in its entirety.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to preventing computer dysfunction or malfunction resulting from a computer program virus, spyware, malware or other program (collective "malware"). More particularly, the present invention relates to differentiating malware programs from non-malware programs which are safe for execution by a computer.

(2) Background of the Invention

Traditional anti-malware programs involve programming that instructs the computer operating system not to execute a malware program having a particular "signature" coding. This requires constant vigilance in first detecting a malware program (usually requiring actual infection of a computer followed by computer malfunction), then formulating and creating a "patch" to be installed on the computer to find and remove the malware. This requires teams of experts at each stage, and a mass distribution system capable of dispensing patches rapidly to many computers.

The number of malware numbers in the hundreds of thousands, if not millions; and the number is multiplying. There is a need for an anti-malware paradigm that is not merely reactive to malware threats, waiting for malware infection and injury to occur so that a band-aid may be applied to the computer to prevent that particular malware malady from re-occurring. There is a need for an anti-malware approach that prophylactically differentiates the already-known non-malware programs within a computer environment, so that they alone will be executed.

One primary object of the present invention is to provide a solution that fortifies the computer environment by directing the computer to ignore malware.

Another object of the invention is to provide a method of differentiating non-malware programs from malware programs.

Another object of the invention is to provide a computer program that efficiently differentiates many non-malware programs from malware programs.

Another object of the invention is to provide a manner of providing those differentiated non-malware programs to multiple computers.

Other objects will become apparent from the disclosure set forth herein.

SUMMARY OF THE INVENTION

In general, a computer executes a program to allow the program to direct the computer to perform the programmed function. This occurs by the computer recognizing some attribute of the software program that signifies that the program is executable, then by following the instructions coded in the program. Malware programs rely upon the same executability attributes, so that the computer will execute it and follow its instructions to create malfunctioning.

The present invention relates to malware protection involving modification or substitution of the computer file name and/or extension and/or header and/or other content or attribute required to be recognized as an executable computer resource by a computer. The term "Referent" means whatever portion of a computer program that is required for recognition as an executable program (including, for example, the file name and/or a portion of coding within the header or body of a computer program file, and/or any other executability signifier of the program), plus references repeating the same in an non-executable computer file such as, for example, support files such as configuration files; "Referent" typically refers to such portions of industry-standard files, but it can also refer to the same in custom-coded files including an industry-standard Referent. By contrast, the term "Substitute Referent" means a Referent that has been modified so that a standard computer will not recognize the computer file or content or software program as executable.

The present invention involves a method of locating Referents and modifying them into Substitute Referents. More particularly, the invention disclosed herein relates to a computer program ("Program") installed on a computer or otherwise used to so modify the programming of a computer, to prevent execution of the malware, or prevent the malware from identifying computer resource names and/or other programs used by such malware. For example, because different operating systems utilize different methods to make computer resources available to software programs, typically malware code has to be customized for each operating system to be executed. Therefore, different types of operating systems are generally immune to attacks from malicious code developed for another operating system.

In general, the present invention involves protecting computing systems by altering, at the system level, the name or other formatting required for computer executable programs and making (at the application level) counterpart alterations of references to the same name or other formatting. More particularly, such protection involves modifying or substituting whatever is required for recognition by the computer for execution of an executable file or software program, and correspondingly modifying a computer so that it will continue to execute the modified executable programs but not programs (such as malware) that have not been so modified and that are in a form that was previously executable by that computer. Although such modification of a computer program may be accomplished manually (or otherwise without a Program performing such modification), naturally it would be beneficial to have a Program that accomplishes the same. Such Program may modify an opcode and/or operating system, thereby implementing a method facilitating the proper functioning of a computing system, without interference from malware.

The invention disclosed herein includes (comprises) computer readable Program previously directed to a computer or member of a computing environment, that substitutes the industry-standard Referent (name or format) of each industry standard computer resource to a corresponding Substitute Referent at the system level; and for other programs that specify the use of one or more of such industry-standard resource names (or reference the same within its program), each of those resource names (or references) is likewise changed to the corresponding Substitute Referent. For example, for a computer having a Windows operating system that uses the file extension to determine that a file is executable, the operating system can be changed to recognize "0.579" to be executable by replacing ".exe" where it is defined within the operating system. So if executable files no longer end in ".exe", any malware ending in ".exe" will be ignored by the computer. (In some instances, the Program may also change the portion of the name before the dot.) Since each of the resource names specified or referenced in all programs using the Substitute Referent on the computer have likewise been changed to the respective Substitute Referent, the computer will continue executing those programs using the identified computer resources.

For another example, in an operating system that uses the ELF file format to determine that a file is executable, the operating system makes several tests to determine that a file is executable, including verifying that the first four characters of the file (part of the file header) are as follows; the first character is a hexadecimal 7F character followed by three ASCII characters ELF, which is called the MAGIC NUMBER. If the operating system is programmed to use any three ASCII character besides ELF, then the industry standard ELF file will fail the test and will not be executable. This includes any malware that is in the industry standard ELF format. The only programs that will run on a computer with a modified operating system are those that have been customized to be executable on that operating system.

Although the prototype of this Program has been developed for a linux operating system, programming can we written that achieves the same goals for any type of operating system or computer with or without an operating or file system.

In another example, an intruder gaining access to a root user's password will use industry-standard commands to carry out a task on the computer. However, the intruder will not be successful if such commands use computer resources having industry-standard names while the commands have been substituted with Substitute Referents unknown to the intruder.

Embodiments disclosed herein describe systems and methods for substituting modified computer executable files, having a Substitute Referent that may be unique to that computer, such that executable software programs on that specific computing system are customized to prevent the execution and spread of malicious code. The system may include (comprise) a single computer (with or without a file system or user interface), multiple computers sharing all or portions of the same common computing environment, server-based networks, or any arrangement of computing components. The modification essentially makes a computer operate as if it is running in its own unique environment, such as with a unique CPU (opcodes) or a unique operating system. Therefore, to be executable, malicious code would have to be customized for each such computing system.

Embodiments may include a computing system, network, and server.

The computing system may be any device comprising a CPU under software control. The computing system may include a substitution editor program for generating and/or implementing unique modification of executable files on the computer, and also in an embodiment applying a unique identifier for that computer.

The unique identifier may be (or include) a string of characters that are utilized to identify the computer. For example, the unique identifier may be a serial number of the computing system, keycode, or any other type of unique identifier.

The Referent substitution editor program may be a local memory device that is configured to assign executable modifications, and it may also have access to a list of Referents that have been defined in an industry standard length or in a different length than the industry standard. In implementations, responsive to requesting a computing resource, the computing system may utilize a modified substitute executable file assigned by the local substitution editor program in place of the industry standard executable file (which may no longer exist in the computing system). The Program need not continue running, after modifying all Referents into Substitute Referents. And because the Referent substitution editor is run only while the computer (storage) is off line (out of service), then the Program does not require any additional real time demand on the computer while it is on line (in service).

The network may be a wired or wireless computer network, or a data port that is configured to communicatively couple the computing system with the server.

The server may be a computer program or device that is communicatively coupled to the computing system via a network. The server may include a memory device that is configured to store unique software repositories.

Each unique repository may be associated with the unique identifier for the computing system; and it may include industry standard programs that have industry standard computer executable content, such as the names of the computer resources available to software programs. However, a unique repository may have modified computer resource files or software programs that are associated with the unique identifier for the computing system, such that only the computing system can execute the modified software programs stored within the unique repository. The modification may be associated with opcodes, file headers, file extensions, administrative and interpreter commands, names of libraries, hardware names, file pathnames, or any system resource an application may utilize to be linked with a system resource. The applications may be any computer software program within a system to assist in the performance specific tasks directly (as in keyboard entries) or indirectly (as in an automotive emission control computer, for example).

In other embodiments, the unique repositories may store substitute modified executable files, modified with unique executability Referents. The unique substitute executability Referent may include substituted binary data characters or substituted string length (or a combination of both) of the industry standard computer executable Referent. By only modifying the portion recognized by the computer as required for execution, without altering any other data or sequence of coded instructions, the modified resource (such as a software program) will perform the same as the original on the computing system.

In one implementation, each Referent for a computing resource may not be altered with a substitute unique executable Referent. For example, only lower level computing resources Referents may be altered with a substitute unique executable Referent, such as CPU opcodes, operating system kernel formats, shared objects, libraries, and/or hardware Referents. This would enable the system to operate effectively and efficiently without having to change Referents to each computing resource, such as all possible hardware or software Referents.

In different implementations, only higher level computing resources Referents may be altered with a substitute unique executable Referent, such as Referents used for or by interpreters. Any combination of high and low level computer resource Referents may be substituted to fortify a computing system.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

One primary object or benefit of the disclosed invention is that it provides a means of avoiding infection by malware, by making such malware non-executable.

Another object or benefit of the disclosed invention is that it makes the computer's resources with Substitute Referents obscure to potential intruders and/or attackers.

Figure 1:
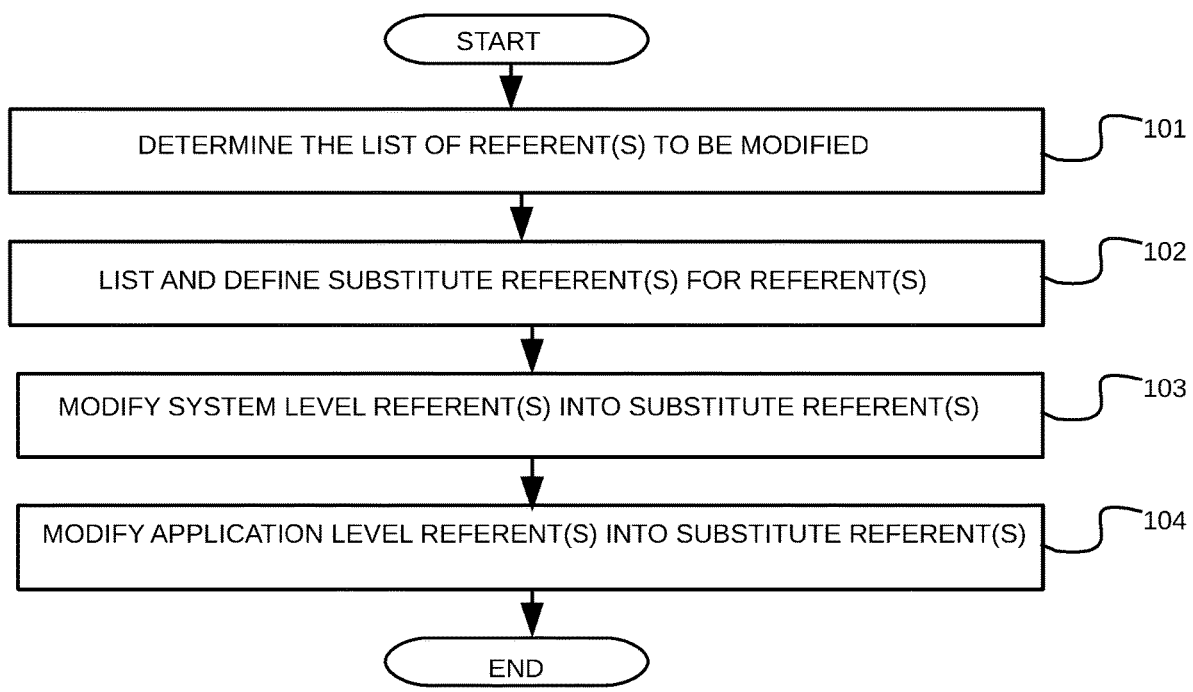
FIG. 1 is a logic schematic illustrating a method for substituting Referents for standard computing resources.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION OF THE INVENTION

In the following description, numerous specific details are set forth in order to provide a thorough understanding of the present embodiments. It will be apparent, however, to one having ordinary skill in the art that the specific details need not be employed to practice the present embodiments. In other instances, well-known materials or methods have not been described in detail in order to avoid obscuring the present embodiments.

Embodiments described herein disclose changing Referents for a computing resource on a computer. For example, file name extensions denoting an executable file may be changed from an industry standard Referent to a substituted Referent that is unique to the computer. As such, the computer may not execute computing resources that do not correspond with the substituted Referents.

For the sake of simplicity and to give the claims of this patent application the broadest interpretation and construction possible, the following definitions will apply:

The term "malware" means any software program intended to interfere with the functioning of a computer or computing system.

The term "modify" or derivative thereof means employing any operation needed to change a portion of an existing computer software program, such as (for example), overwriting characters, deleting one or more characters and replacing the same with one or more different characters, or any operation that produces the result of retaining the functional coding while preventing the software program's recognition by the computer as an executable file.

The term "Program" or derivative thereof means the name-changing or reference-changing software program disclosed as the invention herein.

The term "Prototype" means the programming developed for use with a linux operating system such as Debian version 8.

The term "Referent" means whatever portion of a computer program that is required for recognition as an executable program (including, for example, the file name and/or a portion of coding within the header or body of a computer program file, and/or any other executability signifier of the program), plus references repeating the same in an non-executable computer file such as, for example, support files such as configuration files; "Referent" typically refers to such portions of industry-standard files, but it can also refer to the same in custom-coded files including an industry-standard Referent.

The term "Substitute Referent" means a Referent that has been modified so that a standard computer will not recognize the computer file or content or software program as executable.

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by software media or hardware components, or the construction materials for the same, so long as any structural and/or functional requirements are satisfied. Anything may be used so long as it satisfies the function for which it is being used.

In general, the Program causes the Referent(s) of a list of system level computer resource to be changed from the industry-standard Referent to a Substitute Referent. The Program will also apply each Substitute Referent to the respective counterpart software programs using those system level computer resources. The Program may be deployed to the computer from a host computer, or from machine readable storage media. Ideally, all Referent substitution (and related reference changing) is done while the computer is out of service or otherwise off line. Changes are made to the memory storage (such as a drive) of the computer, and will take effect when the computer is booted into service.

In effect, after deployment of the Program, each computer will have the equivalent of its own unique operation system and/or unique CPU operations codes. This will result in the computer being immune to malware designed to be executable on an operating system having resources with names standardized for that operating system, or malware written for standardized CPUs, because the computer will not recognize the malware (having such standardized resource naming) as an executable program.

The Prototype is a software program written in shell script, to search for resources having listed Referents, for replacement of each a counterpart Substitute Referent. The system level resources may be a predefined list of resource names, or may be all of the resource names for the computer. The Substitute Referent will also be substituted for the standard name wherever the standard name appears in the resource file, such as in the header of executable files for the linux operating system.

In embodiments of the invention, each Substitute Referent may be determined or assigned randomly by a random character generator. Substitute Referents may be generated and assigned to a computer resource by a random character generator, so that the Substitute Referents will not have any human meaning. The Substitute Referent may have the same number of characters as the resource name (Referent) that it replaces; but equality of character number is not always required. In another embodiment, one or more Substitute Referent is generated by the user and assigned to the industry standard Referent.

In any embodiment, there may be a listing or index of each industry standard Referent and its counterpart Substitute Referent, accessible to an interested person as a cross reference.

There are several manners in which the Program can be used. In one instance, once the Program has performed its Referent-changing functions only on the names of software files, the computer's modified software will operate as intended, without any additional modification of hardware or firmware.

Alternatively, the Program may be deployed to change CPU opcodes as well. The following example will illustrate this manner of operating. Assume the computer environment of an X86 box (INTEL X86 work station or server), including a microprocessor with a programmable instruction decoder. The X86 box will come with factory defaults, with the standard X86 instruction set. The Program will thereafter enable the microprocessor to be re-programmed off line to redefine the opcodes to include user defined Substitute Referents. The Program generates the opcodes (Substitute Referents), and renders a report that lists or indexes each standard opcode (Referent) and the counterpart opcode (Substitute Referent) unique for the microprocessor. The report may be used by an existing compiler, modified to accommodate user defined opcodes having Substitute Referents. Alternatively, the compiler may be built just for this Program. This approach will effectively give each computer its own well developed microprocessor and the availability of well developed compatible software.

If the Substitute Referents are limited only to non-CPU opcodes, the Substitute Referents part of the listing or index may be destroyed after the conclusion of deployment of the Program on the computer, because of the random character generator overwriting; however, the listing or index could be recorded and stored in a secure location for reference, but that is not needed for the computer to be fully operational. On the other hand, the listing or index may be required if the Program substitutes CPU opcodes. The listing or index would be needed to be entered into the user defined opcodes of a compiler.

Alternatively, the CPU may be modified to use unique opcodes (with its serial number) identifying the list of unique opcodes. Such modification may occur when the CPU is hard coded during manufacturing.

Small administrative and maintenance tasks can be performed by knowing the unique resource names, by using removable media that converts standard resource names to unique names for each computer. Remote support through a network connection can be performed by the above methods, and may include a database connecting the service tag, serial number, key-code or any unique identifier to a single computer's unique list of resource names in a way that is transparent to field support.

Larger tasks such as upgrades and addition of programs may require a restore to standard resource names (reset to defaults) before performing the task; the Program may then be run to provide new Substitute Referents to industry standard Referents in the computer. This can be best done from a live CD, live USB drive or boot-able hard drive partition.

Ideally, the Program is first installed on, or otherwise accessible for execution by, a host computer. Once installed (or accessed), the Program carries out the following processing tasks to modify the industry standard computer resource Referent(s) to Substitute Referent(s):

(1) search a computer for any industry standard computer resource Referent that matches a Referent defined in a list contained in the host computer;
(2) modify such Referent to a Substitute Referent that is either defined by a user or defined randomly by the Program; and
(3) repeat the above steps until all industry standard computer resource Referents have been modified to the counterpart Substitute Referents.

After such modification, when a malware program enters the computer environment, it will not be executed because its executable Referent is an industry-standard name which is no longer executable on the computer.

To reverse the effects of the Program on the computer, the host computer can reverse the process used to modify Referents into Substitute Referents. Or the user may restore the computer's hard drive from a backup of the computer drive, to the state before the Program was applied. Ideally such backup restores are also run off line (out of service).

Computer resource names can be changed often, as practiced with password security, to further make intruding programs unrecognizable to the computer for execution.

FIG. 1 illustrates a method (100) for modifying Referents into Substitute Referents, according to one embodiment. FIG. 1 depicts a representative sample of the operation of the method (100). In some embodiments, method (100) may be accomplished with or without one or more of the operations discussed and/or with one or more additional operations not illustrated. Additionally, the order in which the operations of method (100) are illustrated in FIG. 1 (and described below) is not intended to be limiting, if the result is the substitution of a Referent into a Substitute Referent.

In some embodiments, method (100) may be implemented in one or more processing devices (e.g., a digital processor, a digital circuit designed to process information and/or other mechanisms for electronically processing information). The one or more processing devices may include one or more devices executing some or all of the operations of method (100) in response to instructions stored electronically on an electronic storage medium. The one or more processing devices may include one or more devices configured through hardware, firmware and/or software, and/or be specifically designed for execution of one or more of the operations of method (100).

In some embodiments, method (100) may be implemented by manually editing industry standard software programs, without a search and replace software program.

At operation 101, a list of industry standard Referents to be substituted into Substitute Referents for the computer(s) may be determined. The list of Referents may be determined with the assistance of artificial intelligence, a user (including an information technology security team member), or a combination of both artificial intelligence and a user. Each listed Referent is associated with a different industry standard computing resource.

At operation 102, a Substitute Referent is generated for each member of the Referent of the list determined from operation 101. A Referent may be either in a text format (such as a filename or filename extension or the ELF characters of an ELF file header) or a binary format (such as CPU opcodes). For text-formatted Referents, a random character generator or a user may define the Substitute Referent. Modification of such Referents by text substitutions may be printable or non-printable characters as in the ASCII format. For binary formatted Referents, a random byte generator or a user may define the Substitute Referent. The Substitute Referent(s) may be of a different character length than the Referent(s), if such alteration will not impair the functionality of the Substitute Referent.

At operation 103, the Referent(s) that are system-level Referent(s) (i.e., that are to be referenced by applications to access such system resource(s)) are substituted into the Substitute Referent(s).

System-level Referents may be in text format or binary format. Binary executable system-level resources may contain text-formatted Referents to be modified into the counterpart Substitute Referents. Substitute Referents may be directly substituted within a binary executable software program when the substitution is the same character length as the Referent. In many instances, a Referent within the source code of a binary executable may be substituted into a Substitute Referent, and compiled into the binary executable, whether the Substitute Referent is the same character length or a different character length as the Referent. Furthermore, once a different-length Substitute Referent is substituted within the source code and then compiled into a binary executable, then direct substitution within the binary executable may occur when another substitution (any future substitution) is the same character length as the Substitute Referent (which is now different in character length than the original industry standard Referent to be substituted).

In many instances, system-level Referents in text-formatted executables may be modified into a Substitute Referent of any character length. Such text-formatted executables are often considered source code, but may not have to be compiled if they may be source code to an interpreter. In many instances, system-level Referents may also be file names of executables which may be modified into a Substitute Referent of any character length up to the maximum allowed by a computing system. In many instances, Substitute Referents resulting from modifications changing the character length may occur within text formatted system resources or file names. Direct substitution of different character length can occur within text formatted system resources or filenames.

CPU opcodes (which may be considered Referents) may be substituted in the source code of a software program and then compiled or assembled into a binary executable. Compilers or assemblers that support custom opcodes may be used to produce binary executables having unique opcodes (Substitute Referent).

At operation 104, each application referencing a system-level Referent is located and modified into using the corresponding Substitute Referent. Referents in text formatted applications may be modified directly into Substitute Referents of any character length. Referents in binary executables may be modified directly into Substitute Referents only having the same character length as the Referent. The Substitute Referent may be substituted in the source code of the software program, and compiled into a binary executable, whether the Substitute Referent is the same character length or a different character length as the Referent. Furthermore, once the reference is substituted within the source code (with a substitution of a different character length) and then compiled into a binary executable, the direct substitution within the binary executable may occur when another substitution (any future substitution) is the same character length as the reference to be substituted (which is now different in character length than the original industry standard reference to be substituted).

Figure 2:
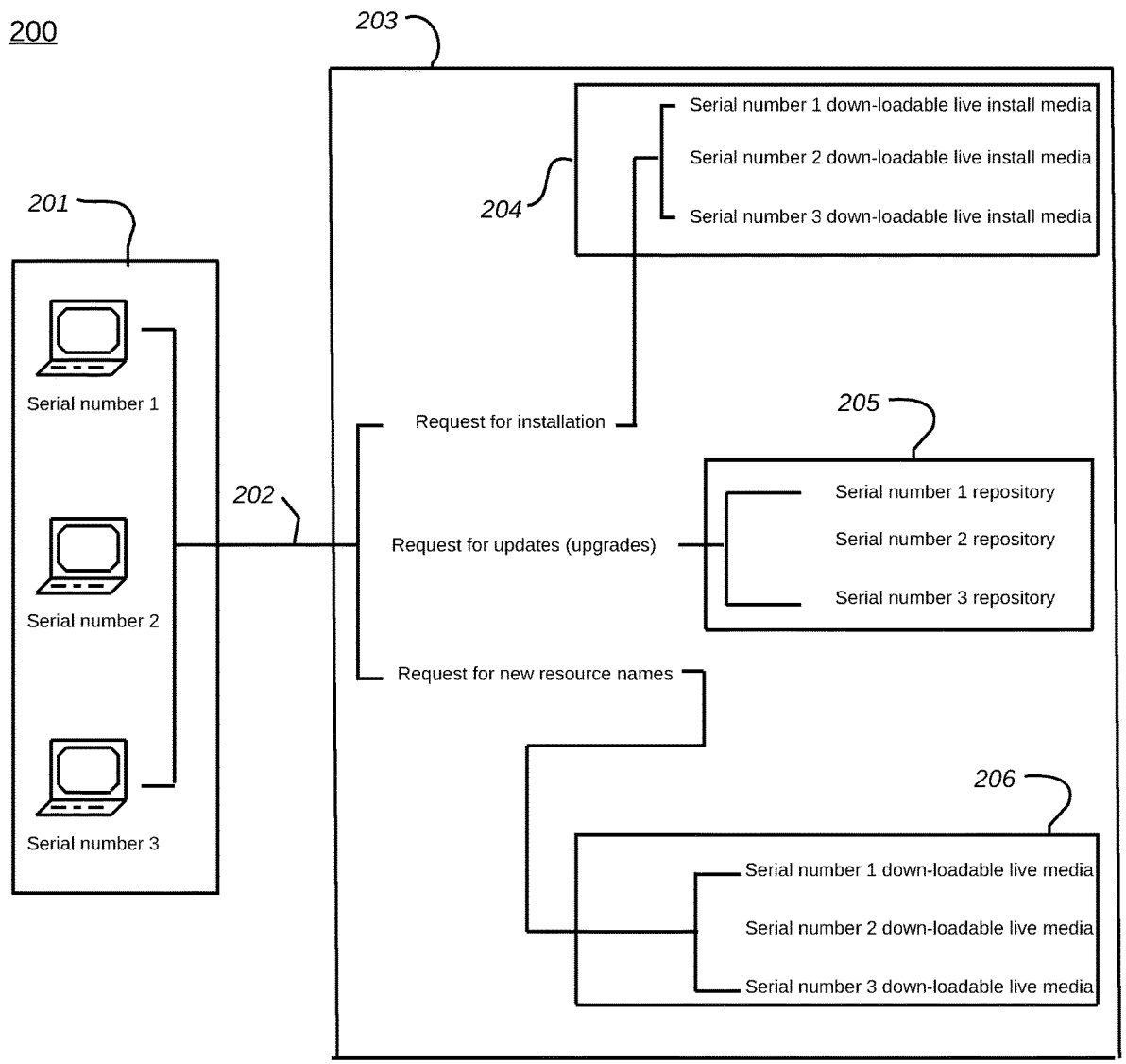
FIG. 2 depicts a network topology.

FIG. 2 depicts a network topology (200), according to an embodiment. Topology (200) may comprise a network connection (202), a group of computing systems (201), and a server (203).

Network 202 may be any type of communication device that allows a transfer of data between a computing system in 201 and the server 203. It will be understood that network 202 may be a combination of multiple different kinds of wired or wireless networks.

Computing systems contained within the group of computing systems (201) may be any device comprising a CPU under software control. Each of the computing systems may also has a unique identifier, so that the server can identify the computing system that is requesting service.

Server 203 comprises groups of software repositories 204, 205, 206. Each group of repositories may be for a different service. Each repository contains industry standard software programs, modified to use Substitute Referents that are unique from other Substitute Referents of other repositories within the same group of repositories. Each repository may share unique Substitute Referents with one repository of all the other groups of repositories.

A computing system of the group of computing systems (201) may connect to a repository of the group of repositories (204 for example) when installing new services provided by the server (203). A unique identifier (such as a serial number, keycode or product key) may be assigned to the computing system during the installation process to be used by the computing system to access all services provided by the server 203. Alternatively the server 203 may uniquely identify the computing system from the group of computing systems 201 by any unique identifier contained in the computing system as opposed to the server assigning a unique identifier. The unique identifier is used by the server 203 to connect the computing system to a compatible unique repositories contained on the server 203.

A computing system of the group of computing systems (201) may connect to a repository of the group of repositories (205, for example) when upgrading, updating, or adding applications. The connection of the computing system to the unique compatible repository is controlled by the unique identifier (such as a serial number, keycode or product key) assigned to the computing system at the time of installation or a unique identifier contained within the computing system. Each repository of the group of repositories contain industry standard software programs whereas the software programs have been modified to use Substitute Referents that are unique from any other Substitute Referents of other repositories contained on the same group of repositories (205).

A computing system of the group of computing systems (201) may connect to a repository of the group of repositories (206, for example) when changing Substitute Referents which keeps intruders from discovering the Substitute Referents through a method of cracking (trial and error until the proper response is returned). The connection of the computing system to the unique compatible repository is controlled by the unique identifier (such as a serial number, keycode or product key) assigned to the computing system at the time of installation or a unique identifier contained within the computing system. Each repository of the group of repositories contain industry standard software programs whereas the software programs have been modified to use Substitute Referents that are unique from any other Substitute Referents of other repositories contained on the same group of repositories 206.

Substitution of Referents into Substitute Referents in topology 200 may be deployed on the off line (out of service) repositories 204, 205, and 206, whereas the software programs contained in the repositories have been edited to contain the Substitute Referents and are ready for the computing system to use without any further Referent modification.

Figure 3:
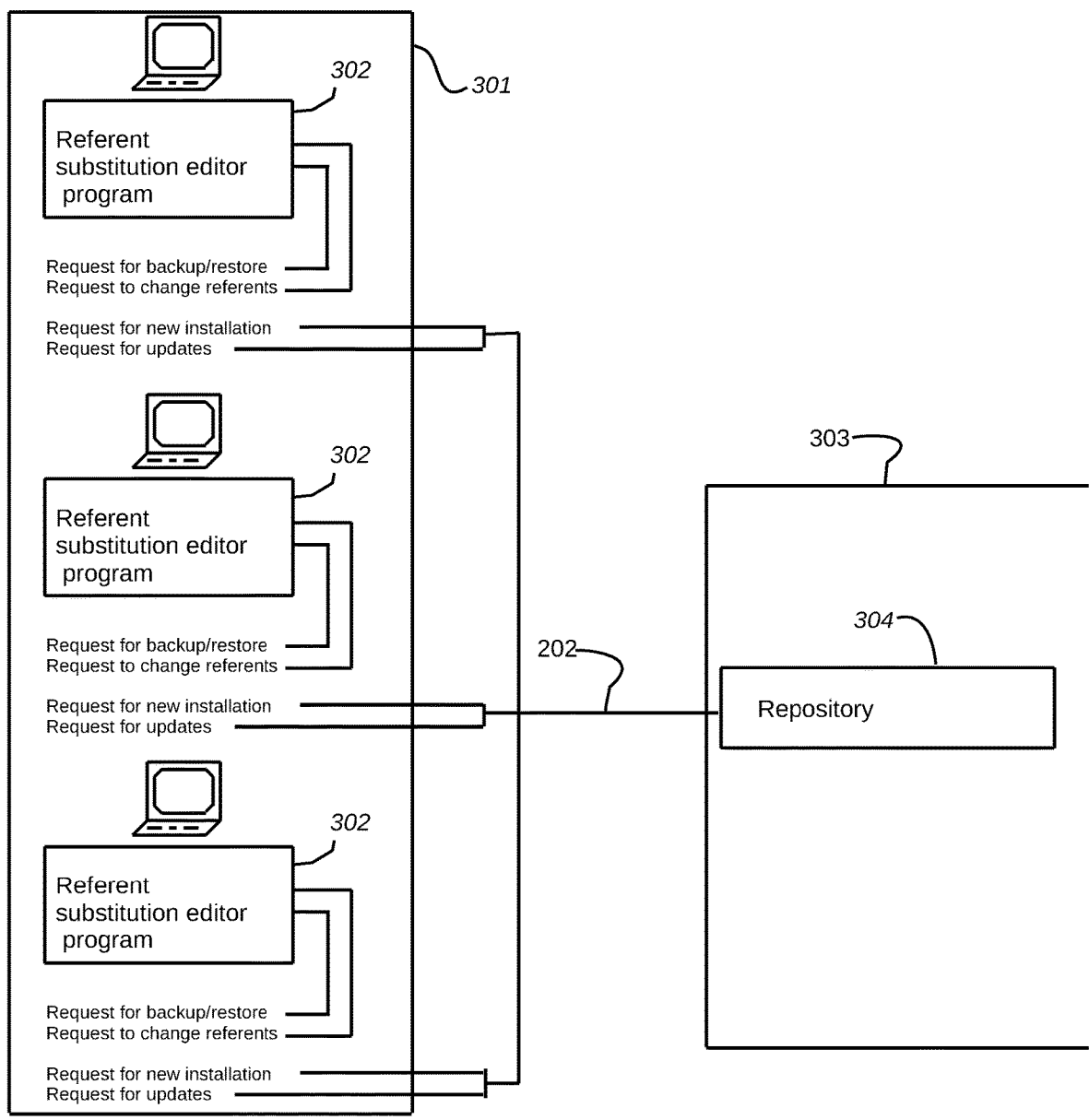
FIG. 3 depicts another network topology.

FIG. 3 depicts a topology (300), according to an embodiment. Topology 300 may comprise a network connection (202), a group of computing systems (301), and a server (303). Computing systems contained within the group of computing systems may be any device comprising a CPU under software control.

Server 303 comprises a repository (304) with industry standard software using industry standard Referents, according to this embodiment. Alternatively, the repository may contain industry standard software programs using industry standard Referents, but with a list of Referents replaced with default Substitute Referents, which are typically longer in character length than the industry standard Referent. For example, if the Substitute Referents are ELF45678 (for the unix) or .exe12345 (for Windows), all of the above could be the default Referent if a minimum character length of eight is specified. Any filler characters can be used to lengthen the Referent into the default Substitute Referent. Then the local Referent substitution program can assign eight random characters to these Referents which would make them harder to discover (crack). This character-lengthening technique may be used to make it harder to discover by means of cracking.

FIG. 3 is used to illustrate 2 embodiments. The Prototype uses the Debian repository (unmodified industry standard), which limits the Referent to three character length for ELF. In another embodiment, if Debian offered another repository including ELF45678 as a Referent (for example), then the Prototype could substitute ELF45678 with another string of eight characters that would be unique for that computer, as opposed to be limited to three unique characters.

In an embodiment each computing system of the group of computing systems uses the referent substitution editor program (302) to replace industry standard Referents with unique Substitute Referents, as explained by method 100. Alternatively in another embodiment that uses a list of longer character length Referents, each referent substitution editor program used by a computing system of the group of computing systems may also have access to the list of default Substitute Referents, when a list of default Substitute Referents of different character length has been defined. This list of default Substitute Referents is used by the referent substitution editor program to substitute Referents into unique Substitute Referents of the same character length as the default Referent.

Substitution of the Referents into Substitute Referents in topology 300 may be accomplished on the off line (out of service) repository 304 and on the off line (out of service) computing system (of the group of computing systems 301), wherein the software programs contained on the repository (304) and the software programs on the computing system have been edited to contain the Substitute Referents and are ready for the computing system to use without further Referent modification while the computing system is on line (in service), according to each embodiment.

Figure 4:
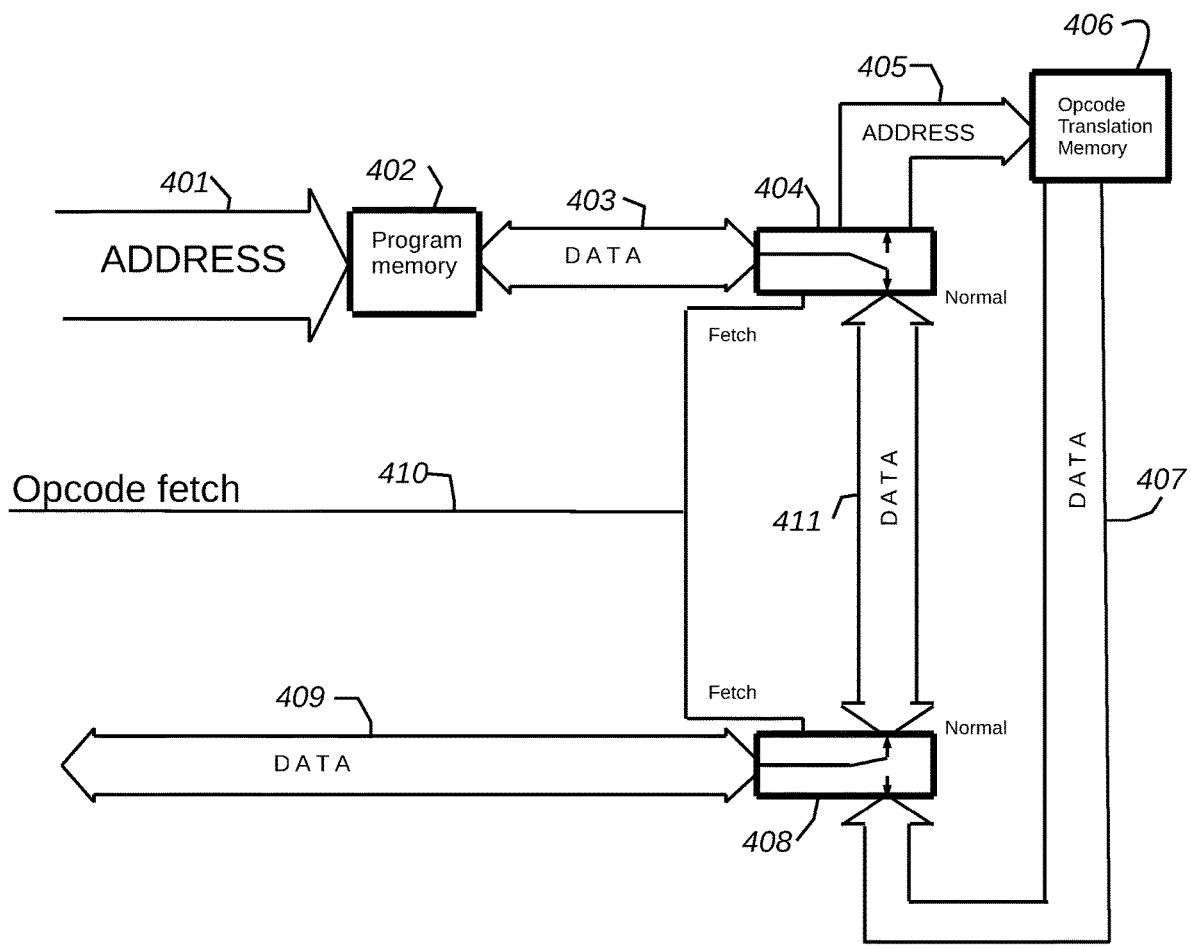
FIG. 4 depicts a hardware topology configured to support the substitution of CPU operating codes.
Figure 5:
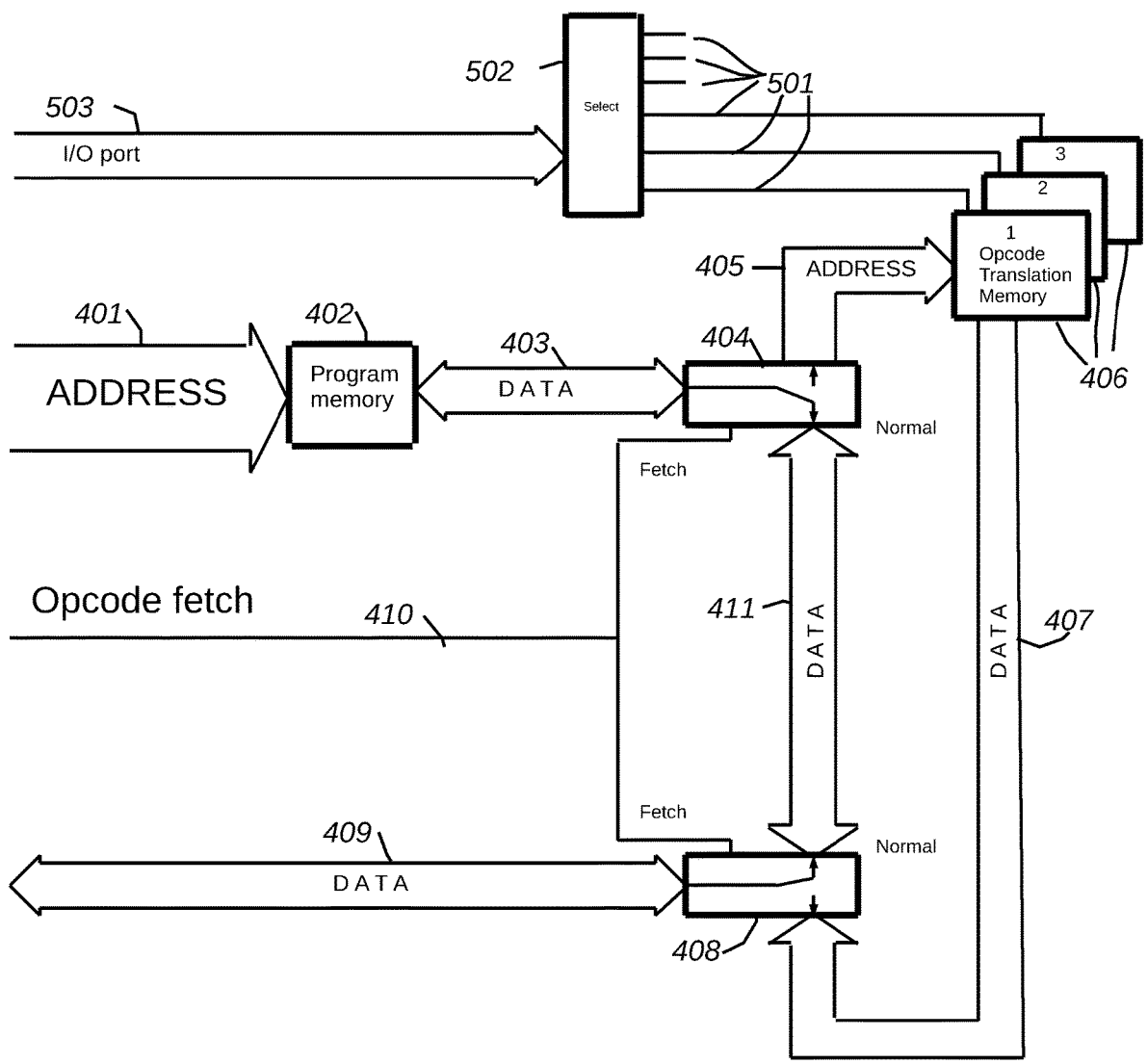
FIG. 5 depicts another hardware topology configured to support the substitution of CPU operating codes.
Figure 6:
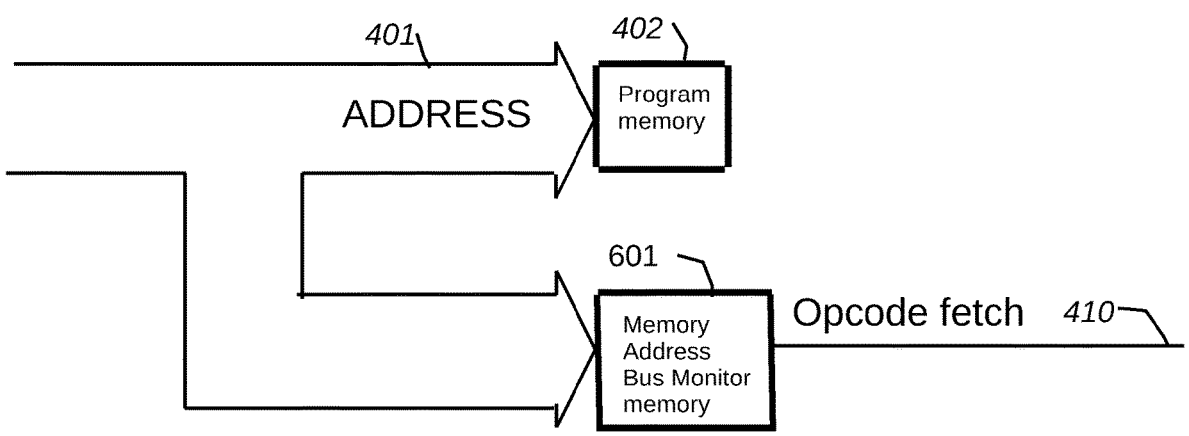
FIG. 6 depicts another hardware topology configured to support the substitution of CPU operating codes.

FIGS. 4-6 depict hardware configured to support the Substitute Referents resulting from substitution of Referents of CPU operation codes (opcodes), according to various embodiments. Every CPU for a computing system of the group of computing systems (201, 301) may have its own instruction set (opcodes). Opcodes may be considered system-level Referents as all applications are compiled, assembled, or interpreted into machine language (containing opcodes) that are part of the instructions that the CPU understands and executes. Each application program references the applicable Referent CPU opcodes to perform the programmed task(s).

In method 100, the opcode Referent stored in the opcode translation memory may be the Referent as explained in operation 103, wherein the Substitute Referent's opcode in the program memory is derived from the Referent, as explained in operation 104.

Hardware topology 400 and 500 may comprise memory address bus (401), opcode translation memory bus (405), program memory (402), bidirectional memory data buses (403, 411, 409), unidirectional opcode translation memory data bus (407), bus selectors (404, 408), opcode translation memory (406), and an opcode fetch signal (410). Hardware topology 500 may comprise additionally I/O port (503), select (502), opcode translation memory select signals (501). Hardware topology 600 may also comprise memory address bus monitor memory (601), program memory address bus (401), program memory (402), and an opcode fetch signal (410).

Program memory (402) may contain industry standard software programs that may have Referents including industry standard opcodes, substituted into unique Substitute Referents opcodes. During an opcode fetch cycle of a Substitute Referent opcode, the opcode fetch signal (410) may be activated and cause bus selectors (404, 408) to remove the normal data path (data buses (403, 411, and 409)) and causes data bus 403 to become the opcode translation memory address bus 405. The opcode translation memory may contain the industry standard opcode at the address selected by the opcode address, which is the substituted opcode contained in program memory (402). This technique translates the substituted opcode contained in the program memory 402 to the industry standard opcode that the CPU is expecting to fetch and execute. The bus select 408 connects the opcode translation memory bus 407 to the CPU data bus 409 during the opcode fetch cycle via the opcode fetch signal 410) which completes the opcode fetch cycle. If and when the fetch opcode is followed by operand (s), then the opcode fetch signal (410) is not active and the normal CPU fetch cycle is completed. The opcode fetch signal (401) is only activated during the opcode fetch portion of the whole CPU instruction fetch cycle.

FIG. 5 depicts a hardware topology (500) that adds to topology 400 the ability for software programs to select unique opcodes, according to various embodiments. This technique may give each software program the ability to use unique opcodes for each software program as opposed to all software programs being limited to using unique opcodes for the computing system.

Hardware topology 500 may comprise topology 400, an I/O port (503), a opcode translation memory bank select (502), a plurality of opcode translation memory bank select signals (501), and a plurality of opcode translation memories (406). I/O port 503 may be decoded by select 502 to select one of the memories of the opcode translation memory banks 406. I/O port 503 is under software control and may be activated only when program memory 402 requires the use of unique opcode translations and to select the proper set of unique opcodes for the software program stored within the program memory 402.

The address bus (405) of opcode translation memory may be wider than the program memory data bus (403), in which case the upper portion of opcode translation memory bus 405 may be directly connected to I/O port 503 to select the proper opcode translation memory 406 section (bank) and select 502 may not be needed. Also the upper portion of the opcode translation memory address bus 405 may be connected to the upper portion of the memory address bus 401 (code segment) to select the proper opcode translation memory section.

FIG. 6 depicts a hardware topology (600) that may us a memory address bus monitor memory (601) to generate an opcode fetch signal (410) that may be used by hardware topology 400 and/or 500, according to various embodiments. The memory address bus 401 may be connected to the memory address bus of the memory address bus monitor memory 601 so that the CPU addresses a common address of both program memory 402 and the memory address bus monitor memory 601. The memory address bus memory 601 may store data that activates the opcode fetch signal 410 at the addressed location of program memory 402 that stores a Substituted Reference (an opcode) that needs to be translated. The memory address bus monitor memory 601 is not concerned with which opcode is stored at the address, but only that an opcode stored at that address needs to be translated and activates the opcode fetch (401).

Opcode fetch signal 410 may be switched on or off to accommodate a mixture of industry standard software programs using industry standard Referents and software programs using unique Substitute Referents within the same computing system, according to an embodiment.

Other utility and advantages will be apparent to somebody of ordinary skill in the field, upon a review of this application.

I claim:

1. A method of protecting a target computer's malware-free computing environment by preventing the execution of incoming malware having a particular executability signifier Referent recognized by the target computer's CPU for resources of said computing environment, the method comprising:

(a) prior to any arrival of said malware, putting the target computer in a pre-boot state;
(b) then a host processing device modifying each instance of said target computer resource's executability signifier Referent into a counterpart Substitute Referent, by changing the executability signifying characters to counterpart characters; and
(c) the target computer CPU recognizing the Substitute Referent as executable but not recognizing as executable the Referent of the unmodified incoming malware.

2. A method described in claim 1, further comprising the earlier step of, with the host processing device functionally connected to the computing environment of the target computer, searching the computing environment for said Referent(s) for modification into the counterpart Substitute Referent(s).

3. A method described in claim 1, wherein at least one such Substitute Referent is generated by a person.

4. A method described in claim 1, wherein at least one such Substitute Referent is generated by a random character generator, or a random byte generator, and combinations thereof.

5. A method described in claim 1, wherein the number of characters in said Substitute Referent is different than the number of characters in its counterpart Referent.

6. A method described in claim 1, further comprising the step of grouping said Substitute Referents into at least one repository of software programs accessible to the computing environment, with said repository being generated by said host processing device.

7. A method described in claim 6, wherein the computing environment includes at least one member selected from the group consisting of a single computer or device, a plurality of computers and/or devices, a plurality of computers and/or devices functionally connected, a computer and/or device functionally connected, removable media functionally connected to at least one of the aforementioned members, and combinations thereof.

8. A method described in claim 7, wherein said at least one member has a unique identifier associating said repository to said member.

9. A method described in claim 8, wherein said computing environment includes a plurality of said members, each having its own unique identifier associating said member with said repository having Substitute Referents unique for said member.

10. A method described in claim 1, wherein at least one of said Referents is contained within the source code of a software program, and said modification into any Substitute Referent comprises compiling said source code modified to code for said Substitute Referent.

11. A method of protecting a target computer's malware-free computing environment by preventing the execution of incoming malware having a particular executability signifier Referent for said computing environment, comprising the steps of:

(a) prior to any arrival of said malware, putting the target computer in a pre-boot state;
(b) with a host processing device having a Referent search-and-modification program installed thereon, searching the target computer's computing environment while it is in said pre-boot state, for modification of at least one Referent into a counterpart Substitute Referent;
(c) modifying each instance of a Referent into a counterpart Substitute Referent, by changing the executability signifying characters to counterpart characters; and (d) the target computer CPU recognizing the Substitute Referent as executable but not recognizing as executable the Referent of the unmodified incoming malware.

12. A method described in claim 11, further comprising the steps of, before step 6(a), generating a list of Referents to be searched by said program, and generating a list of counterpart Substitute Referents to be produced by said program.

13. A method described in claim 12, wherein at least one of said Referents and/or Substitute Referents in either of said lists is defined by a person.

14. A method described in claim 12, wherein at least one such Substitute Referent is generated by a random character generator or a random byte generator, or combination thereof.

15. A computer-readable program on non-transitory media for protecting a malware-free computing environment of a target computer by preventing execution of incoming malware having a particular executability signifier Referent for said computing environment, by causing performance of processing thereon comprising the steps of:

(a) a host processing device searching the malware-free target computer's computing environment while in a pre-boot state, for at last one executability signifier Referent; and (b) modifying all resources therein having said executability signifier Referent, by changing the executability signifying characters to counterpart characters and thereby substituting each Referent with a counterpart Substitute Referent, so that the target computer's CPU recognizes the Substitute Referent as executable but does not recognize as executable the Referent of the unmodified incoming malware.

16. A computer-readable program described in claim 15, comprising the further steps of, before step 21(a), generating a list of Referents to be searched by said program, and generating a list of counterpart Substitute Referents to be substituted.

17. A computer-readable program described in claim 16, comprising the further step of grouping said Substitute Referents into at least one repository of software programs accessible to the computing environment.

\* \* \* \* \*